United States Patent [19]

Duncan, IV.

[11] Patent Number: 5,060,154
[45] Date of Patent: Oct. 22, 1991

[54] ELECTRONIC TYPEWRITER OR WORD PROCESSOR WITH DETECTION AND/OR CORRECTION OF SELECTED PHRASES

[75] Inventor: Howard C. Duncan, IV., Dryden, N.Y.

[73] Assignee: Smith Corona Corporation, Cortland, N.Y.

[21] Appl. No.: 531,198

[22] Filed: May 31, 1990

Related U.S. Application Data

[63] Continuation of Ser. No. 294,248, Jan. 6, 1989, abandoned.

[51] Int. Cl.⁵ .............................................. G06F 15/38
[52] U.S. Cl. .................................... 364/419; 400/63
[58] Field of Search .................. 400/63, 14; 364/419, 364/900

[56] References Cited

U.S. PATENT DOCUMENTS

| | | | |
|---|---|---|---|
| 3,558,820 | 6/1968 | Baisch | 400/94 |
| 4,671,684 | 6/1987 | Kojima | 400/63 |
| 4,783,758 | 11/1988 | Kucera | 400/63 |
| 4,797,855 | 1/1989 | Duncan | 400/63 |
| 4,810,121 | 3/1989 | Uneo | 400/63 |
| 4,830,521 | 5/1989 | Sakai | 400/63 |

Primary Examiner—David A. Wiecking
Assistant Examiner—Steven S. Kelley

[57] ABSTRACT

A word processing system or memory typewriter having a list of misused phrases together with alternative phrases for each misused phrase in the list and all stored in the memory. The memory includes a spelling Dictionary part and a phrase alert part which is responsive to the spelling dictionary part and including therein a list of alternative phrases both being available for comparison with the words and phrases being introduced into the system; a detection element for sensing entry of any phrase on the phrase alert list, a selectively enabled generator of a warning signal for the operator being activated in response to sensing entry of any of said phrases by said detection element; a first control responsive to pressing a discrete one of a depressible keys. The first control is operable to present in the display any phrase so detected along with alternative phrases therefore.

9 Claims, 7 Drawing Sheets

| PAGE: 1 LINE: 1 | | MEM. REM.-50818 |
|---|---|---|

```
L::::T:::::::::::::::::::::::::::::::::::::::::::::R:::::::::::::::::::
    20      30      40      50      60      70      80      90
```

Phrase Alert
Position Cursor

| Incorrect | On | Contractions | On |
| Wordy | On | Redundant | On |
| Gender Specific | On | Cliche | On |
| Informal | On | Split Infinitives | On |

Press [ ] to Select, [ ] to Enter, or [ ] to Cancel

```
PAGE:  1     LINE:     1                                MEM. REM.-50761
L::::T:::::::::::::::::::::::::::::::::::::::::::::::::R:::::::::::::::::
     20     30     40     50     60     70     80     90
It was a [          ] that he broke his mother's heart.
```

Phrase Alert
Cliche                                        Make Selection

*shame                          —
-pity                           —
 —                              —

Position Cursor, Press [      ] to Select, or [      ] to Exit

FIG.6A

```
PAGE:  1     LINE:     1                                MEM. REM.-50818
L::::T:::::::::::::::::::::::::::::::::::::::::::::::::R:::::::::::::::::
     20     30     40     50     60     70     80     90
He failed to clearly see how his actions would hurt others.
It was a [          ] that he broke his mother's heart.
```

Grammar Right
                    Position Cursor

Spell Right          On
            Word Alert           Off
            Punctuation Check    Off
            Phrase Alert         Off
Press [      ] to Select, [      ] to Enter, or [      ] to Cancel

FIG.6B

ELECTRONIC TYPEWRITER OR WORD PROCESSOR WITH DETECTION AND/OR CORRECTION OF SELECTED PHRASES

This is a continuation of application Ser. No. 07/294,248, filed Jan. 6, 1989 now abandoned.

CROSS REFERENCE TO RELATED APPLICATIONS

The present invention is an improvement on the electronic typewriter and/or word processor disclosed in:

I) Application Ser. No. 813,351 now U.S. Pat. No. 4,783,761 entitled "SPELLING-CHECK DICTIONARY WITH EARLY ERROR SIGNAL", filed Dec. 26, 1985 by R. W. Gray et al;

II) Application Ser. No. 869,777 now U.S. Pat. No. 4,807,181 entitled "DICTIONARY MEMORY WITH VISUAL SCANNING FROM A SELECTABLE STARTING POINT" and filed June 2, 1986 by Howard C. Duncan IV et al;

III) Application Ser. No. 000,700 now U.S. Pat. No. 4,979,855 filed by Howard C. Duncan IV et al on Jan. 6, 1987 and titled "ADAPTIVE SPELLING CORRECTOR";

IV) Application Ser. No. 000,698 now U.S. Pat. No. 4,907,900 filed by Howard C. Duncan IV on Jan. 6, 1987 and entitled "AUTO RE-ALIGNED PRINT CORRECTION";

V) U.S. Pat. No. 4,655,620 issued to Donald T. Adams et al on Apr. 7, 1987 and entitled "SPELLING ERROR FINDING FEATURE INCLUDING AN ELECTRONIC SPELLING DICTIONARY".

VI) Application Ser. No. 141,030 now U.S. Pat. No. 4,887,920 filed by Doris J. McRae and Richard E. Roberts on Jan. 5, 1988 and entitled "PUNCTUATION CHECK FEATURE FOR AN ELECTRONIC TYPEWRITER";

VII) Application Ser. No. 141,247 now U.S. Pat. No. 4,923,314 filed by Raymond A. Blanchard Jr. et al on Jan. 6, 1988 and entitled "THESAURUS FEATURE FOR ELECTRONIC TYPEWRITERS"; and VIII) Application Ser. No. 141,031 now U.S. Pat. No. 4,847,766 filed by Doris J. McRae and Richard E. Roberts on Jan. 5, 1988 and entitled "DICTIONARY TYPEWRITER WITH CORRECTION OF COMMONLY CONFUSED WORDS".

Note that all eight applications/patent are assigned to the present assignee and that for convenience and brevity they will be referred to by the above-shown Roman numerals when cited in the specification. Material therein relevant to the present invention is hereby incorporated by reference.

FIELD OF THE INVENTION

The invention relates to word processors (or "memory" typewriters as they are sometimes called), which normally incorporated the capability of correcting any potentially objectionable phrases in a last-entered group of words such as a line, paragraph, etc. More particularly, the present invention relates to alerting the operator to potentially objectionable phrases being typed into the system and providing for the selection of alternate phrases.

BACKGROUND

Correcting typewriters have long been known (e.g., U.S. Pat. No. 3,780,846 entitled "Automatic Erasing Typewriter" and filed by Robert A. Kolpek et al, which issued Oct. 9, 1973) which can remove incorrect characters and allow entry of correct ones by following an appropriate sequence of keystrokes.

Subsequently, "Dictionary" typewriters have appeared on the market which contain a listing of over 50,000, say, correctly-spelled-words stored in a read-only section of an electronic memory (e.g. the Smith-Corona XD7000 based on structure substantially as disclosed in Reference I). An error detection unit monitors successive text entries and emits a visual or auditory signal when comparison of an entered word with the words stored in the "dictionary" shows disagreement with spelling of the entered word. In more powerful versions of the typewriter having an associated display unit, after an incorrect word has been entered the typist may then cause (Ref.II) a search of the stored words based on initial, probably correct letters of the entered word, to find and display—in alphabetical order—successive, properly-spelled "trial" words (in a "List Mode" as it has been termed sharing those initial letters of the incorrect word, one of these trial words then being selectable to replace the incorrect word. The "trial" word may also be selected statistically according to types of spelling errors most frequently committed by the typist (Ref.III).

Since that time, the market has likewise seen the advent of electronic typewriters with memories storing thesaurus from which a typist can select one of a succession of synonyms and retrieve it for replacement of an over-used word. (Ref VII).

While the foregoing improvements had done much to enhance the quality of communications prepared by typists and operators of word-processors etc, there still remained the problem of words used incorrectly but not discriminated by the above-described systems because they are properly spelled (e.g. homonyms: boar and bore, vulgarisms: "learn" for "teach", etc.). Yet, in the past such words require time-consuming, knowledgeable proofreading for detection and slow, manual keyboard operations for correction of text.

A list of commonly-confused words numbering some 1,600 in total is recognized by the industry as a source of communication errors in word processing.

And for example, IBM U.S. Pat. No. 4,674,065 disclosed a system for detecting "homophones and confusable words" present in a list stored in memory along with related sets of syntactic rules. Each word in the list is identified with specific sets applicable in determining proper usage. By applying appropriate rules on entry of a listed word, propriety of usage may be ascertained and if improper, alternative words and their definitions presented for a decision by the operator. At that point, the operator may select an alternative word to replace the misused word by positioning the display cursor under the desired alternative and depressing an appropriate key on the keyboard. The approach is powerful and significantly reduces "noise"—i.e., repetitious presentation of commonly confused words, definitions and alternatives is reduced where they are not a problem to a given operator. This advantage is achieved, however, at the expense of considerable addition of memory capacity devoted to the rules and identification of their applicability in each instance.

Thereafter, there was developed a simple, low-cost yet efficient electronic typewriter and word-processing system discerning the presence of misused words of the commonly-confused type and along with a means for providing information as to related alternatives selectable by the typist. The system was adaptable to electronic typewriters of the consumer type having limited display and memory capacity, and it should permit elimination of unwanted signaling of words and further, the selection of replacement of a misused word by an alternative should preferably be performed in a simple fashion. Such a system was described in Ref. VIII.

While the foregoing improvements had done much to enhance the quality of communications prepared by poor spellers, beginning writers, etc., there still remained the problem of phrases used incorrectly, cliches, gender specific terms, redundant phrase, split infinitives, and contractions not discriminated by the above-described systems because they are properly spelled ( e.g. their are, end result, as the saying goes, etc.). Yet, in the past such phrases require time-consuming, knowledgeable proofreading for detection and slow, manual keyboard operations for correction of text.

Thus, there is need for simple, low-cost yet efficient system discerning presence of "bad" phrases of the potentially misused type and providing information as to related alternatives selectable by the typist. The system should be adaptable to electronic typewriters of the consumer type having limited display and memory capacity, and it should permit elimination of unwanted signaling of phrases. Furthermore, selection of replacement of a misused phrase by an alternative should preferably by performed in a simple fashion.

SUMMARY OF THE INVENTION

A word-processing system having a memory, character and control input to the system through a keyboard with plurality of alphanumeric and function keys depressible by an operator, and a display; in combination wherein said reference memory includes a spelling dictionary part and a phrase alert part which is responsive to the said spelling dictionary part and including alternate phrases both being responsive to monitor the words and phrases being introduced into the system; a detection element for sensing entry of any phrase on the phrase alert list, a normally enabled generator of a warning signal for the operator activated in response to sensing entry of any listed phrase by the detection element; a first control responsive to pressing a discrete one of the depressible keys, the first control being operable to present in the display the entered phrase along with at least one alternate phrase; and a second control interposed between the detection element and the warning signal generator, the second control being actuatable by the operator for selectively disabling responsiveness of the generator to entry of any particular phrase category on the list.

According to further feature of the invention, the second control is associated with a modified dictionary list of properly-spelled words incorporated in the system, and access to the list of potentially misused phrases is controlled—in turn—by information in the dictionary list.

Accordingly, it is an object of the invention to provide an improved memory typewriter or word processing system having fast, efficient and selective detection and proper replacement of potentially misused phrases in text presented on a display and/or a printed document.

It is a further object of the invention to provide controls for ceasing to call attention to any group of commonly-misused phrases when the typist no longer wishes to check for that phrase group. This affords the typist the opportunity for selectivity in writing style.

Moreover, it is yet another object of the invention to allow a less knowledgeable typist to revoke a previous typist's selective alteration of the above-mentioned controls so that the less knowledgeable typist can receive the benefit of response to entry of phrases in the complete list.

Furthermore, it is still another object of the invention that when misused phrase are located within a string of valid words, and an alternative phrase selected from the list is of different length than the misused phrase, then upon operator acceptance of a displayed definition as being that of the phrase actually desired—an acceptance indicated by depression of a print control key, automatic erasure of erroneous characters and improperly located characters on the document occurs followed by printing of appropriate characters of the alternative phrase and any relocated characters in proper alignment on the document.

Other objects and features of the invention will become evident from a reading of the ensuing description taken in conjunction with the drawing.

BRIEF DESCRIPTION OF THE DRAWING

FIG. 1 is essentially similar to the identically numbered figure in the above-cited U.S. Pat. No. 4,655,620 (termed Reference V hereinafter). Note that reference numerals are generally the same for like elements in the main figures of all cited applications, but where elements are specific to the present invention, reference numerals are three digits long and beginning with the number 800.

DESCRIPTION OF THE PREFERRED EMBODIMENT

The invention may be applied to what may be broadly termed an interactive word information processing system 10 either of the type having separate, cable-connected modules or in the form of a single unit such as a "memory" typewriter 10 (or electronic correcting typewriter as it is also termed). For simplicity, the latter form will be assumed for the present description. In either case, according to the block diagram of FIG. 1, System 10 has four principal units: a Keyboard 12, a Printer 14, a Display 16, and an Electronic Control Circuit 11 (encircled by dashed lines), in which—according to the invention—a Phrase-Alert Feature 800 (an adjunct bounded by dot-dash lines at left in FIG. 1) is incorporated. As seen, Phrase-Alert Feature 800 memory comprises a Phrase-Alert Control 802, a phrase alert tree 805 and a phrase-Alert List 804, this tree 805 and list 804 containing the 2,900 misused phrases. Phrase Alert Control 802 is primarily concerned with alerting of the typist when one of the phrases in tree 805 is entered through Keyboard 12. Further, another memory unit 52 in Electronic Typewriter or System 10, stores a Spelling Dictionary 806 identical to Dictionary 56 disclosed in Reference I except for addition of a special code identifying a phrase word also present in List 804, and addition of certain address codes relevant to Phrase-Alert Feature 800, as described in detail subsequently.

Figures 1, 1B:
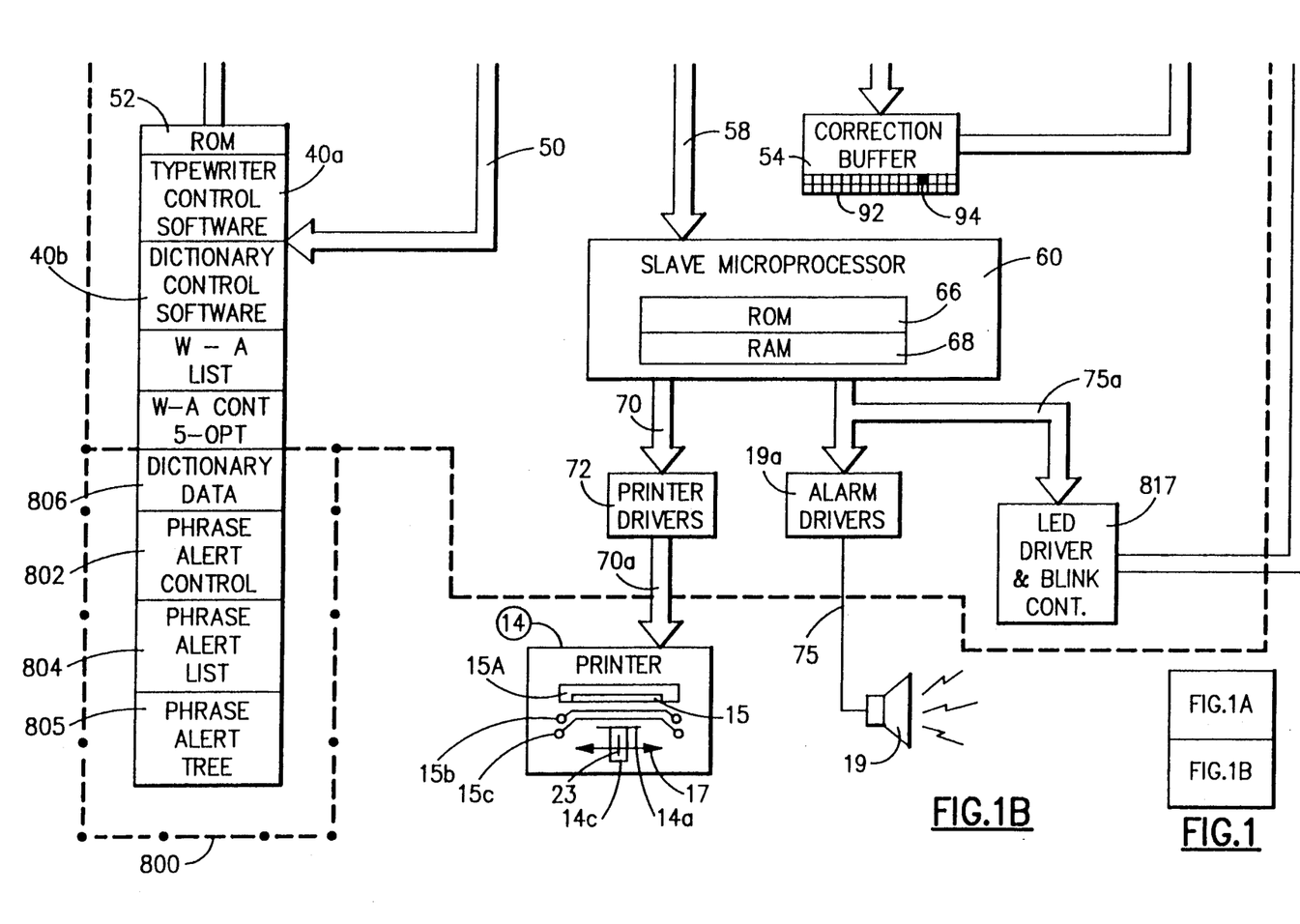
FIGS. 1, 1A and 1B show a block diagram of a word-processing system or memory typewriter having a stored dictionary and, according to the invention, a stored list of misused phrases together with controls included in the stored dictionary for accessing the list to display the phrases and providing automatic replacement of a misused phrase by a particular alternative upon the typist's selection.
Figure 1A:
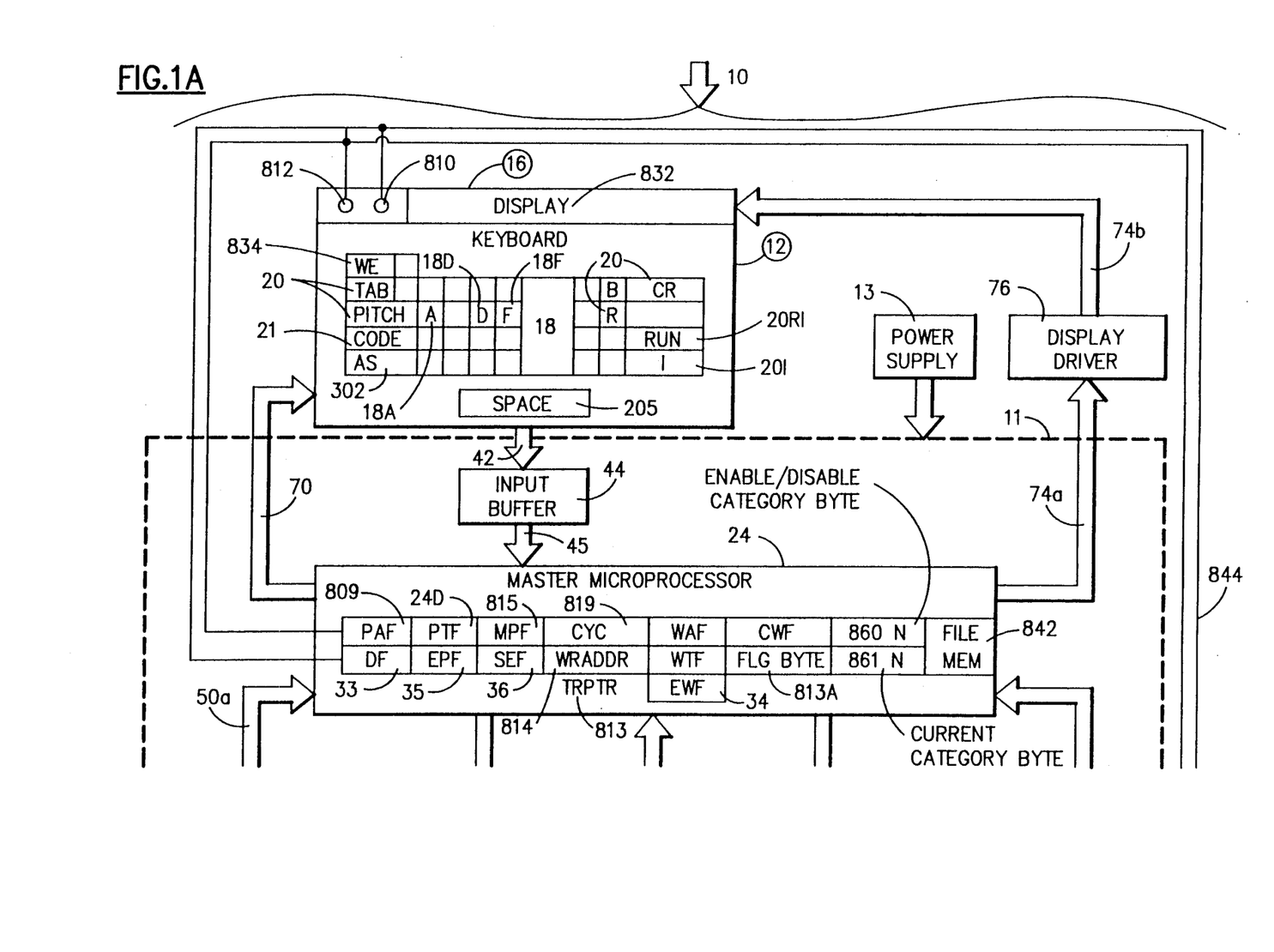

The four principal units 11, 12, 14 and 16 of FIG. 1 interact in the usual fashion, manual selection of any desired typewriter operation being made at Keyboard 12, Printer unit 14 and/or Display 16 are operated under control of Electronic Circuit 11 for accomplishing the function selected by a keyboard input—for example, printing and/or displaying a character corresponding to a character key 18 selected by the typist or corresponding, according to the present invention, to a character supplied by Phrase-Alert List 804.

Keyboard 12 contains the usual plurality of Character Keys 18, Carrier Control Function Keys 20 (including Return 20R, Backspace 20B, Index 20I, Reverse Index 20RI, Spacebar 20S, etc.), and a "Code" Key 21 (always operated in conjunction with one of the keys 18 or 20) as well as an Auto-Spell Key 302 (identified as such in Reference III, but having a dual response for purposes of the present invention). Code Key 21 serves to select an operative mode of the system such as the "Dictionary" mode previously disclosed in Reference I and the "Phase-Alert" mode to be described herein.

Upon depressing any one of the various keys on Keyboard 12, a respective keyboard output signal is communicated to Electronic Control Circuit 11, the outputs of which control functions and operations of Typewriter 10. Mainly, these operations relate to the various components of Printer 14—namely, a Platen 15a supporting a Document 15, and a Carrier 14c which holds a rotatable Print Wheel 14a having a plurality of characters formed on it. Print Wheel 14a may be brought into alignment with a Print Hammer 23 for application of characters to Document 15 and subsequent removal of same, if desired, by selective use of an Inked Ribbon 15c or a Correction Ribbon 15b. Print Hammer 23 strikes the aligned character against Document 15 (a sheet of paper or other recording medium) supported on Platen 15a. The striking occurs through the selected one of the Ribbons 15b, 15c in known fashion. Carrier 14c is mounted on Typewriter 10 for left and right horizontal movement along Platen 15a (as inducted by arrowheads 17) upon pressing Backspace Key 20b and Spacebar 20S, respectively, and also for return to the left margin or stop setting (with an accompanying line-feed) when Carrier Return Key 20R is actuated.

The block diagram of FIG. 1 provides an overall view of the Control Circuitry 11 used for implementing the Phase-Alert feature 800. A Power Supply 13 is connected to provide the electric power necessary to operate the various electronic components in control circuitry 11. As shown in FIG. 1, system operation is controlled here by communication between Keyboard 12, and a Master Microprocessor 24 (located within Circuit 11 and being a known electronic component such as the 8031 made by Intel Corporation of Santa Clara, Calif.). This communication occurs by use of an equally well-known interrupt technique issued periodically (e.g. every 7 milliseconds) on bus lines 70. As a result of the interrupt, Keyboard 12 (more particularly, a matrix arrangement of keyboard switches, which is not shown, but is known) is scanned to detect actuation of any key, 18, 20, etc. A logic code signal representative of the key actuated appears on bus line 42 extending to an Input Buffer 44 (a Hex Non-Inverting buffer, such as a CD 4503 made by National Semiconductor Co. of Santa Clara). Keyboard signals are temporarily stored by Input Buffer 44 in order of keyboard entry. Master Microprocessor 24 receives data—in turn—from Input Buffer 44 via bus line 45.

Master Microprocessor 24 typically has various electronic control elements including a known Status RAM 24D which provides temporary storage of presently active information—e.g. a plurality of Flags (known single-bit, two-state memory units) periodically interrogated as part of the system's program routine. The flags relevant to the invention include—among others discussed herein—a Dictionary Flag 33, a "Phrase-Alert" Flag 809 indicating that scanning entries for "misused phrases" has been activated, and a "misused phrase" Flag 815 which is set upon detection of such a phrase either after entry through Keyboard 12 or after forward (or backward) scanning of text stored in Correction Buffer 54, as will be described. Other known flags may also be present for purposes of particular activities not relevant to Phrase-Alert.

Master Microprocessor 24 is associated with external electronics including ROM unit 52 for controlling Master Microprocessor 24. ROM unit 52 contains Typewriter Control . Software 40a, Dictionary Control Software 40b, and the Phrase-Alert feature 800, this last having not only the corresponding Control Software 802 and List 804 of misused phrases, but also a special set of Dictionary Data 806, as mentioned earlier. That set 806 comprises the usual character codes forming a list of properly-spelled words used to verify the spelling order of characters upon release of printer decode signals from RAM area 54 described briefly below. According to the invention words in misused phrase are identifiable by noting their specific known "address" in dictionary ROM 806. These known addresses are stored in a tree 805 to allow for quick and efficient scanning of the phrase data base.

As also seen in FIG. 1, the character and control code signals appear on a bus line 50 connected to a ROM 52 (Read-Only Memory). ROM 52, in response, sends data and control signals to Master Microprocessor 24 via bus line 50a. In the instance of pressing a printable symbol Key 18, for example, the printer code signals are sent to a RAM 54 for storage, this last serving as a Correction Buffer 54 (as it will be termed hereinafter) and storing a full line of text characters. ROM 52 preferably also includes a tertiary set of program instructions for the automatic statistical correction operation according to Auto-Spell System 300 of Reference III, and a Correction Element Storage 304 (neither shown herein).

Correction Buffer 54 operatively associated with Master Microprocessor 24 comprises a stack of memory bytes 92 (a static RAM having 1024×4 bits and being identified as an IC unit known commercially by the designation "2114") for storing coded information as to characters selected at Keyboard 12 and processed by Microprocessor 24. Correction Buffer 54 is addressable by a Display Cursor 832 (shown as an underline in Display 16) coordinated with a pointer 94 (shown solid in FIG. 1 and termed a "find" pointer hereinafter for reasons becoming evident shortly) located at a byte position corresponding to the current position of Carrier 14c. In this regard, the character previously entered at the current position of Carrier 14c can be recalled from Correction Buffer 54 for purposes of correcting the text. Find Pointer 94 can be moved progressively through the stack of bytes 92 in conjunction with movement of Carrier 14c such that the byte currently indicated has the coded information corresponding to the related character position along Platen 15a. This "find" activity is utilized here (see Reference V, for instance) to locate a misused phrase just detected by Phrase-Alert Feature 800 and signaled to the typist, but overrun because of the latter's reaction time.

A character code signal ready for printer processing is sent along the line 58 (output channel) from Master Microporcessor 24 to a further Microprocessor 60 which is slaved to Microprocessor 24 as master. Slave Microprocessor 60 (e.g. the 8051 also made by Intel and identical to the 8031 except for program memory) has its program stored internally in a ROM 66 (4K×8 bits), the code data being stored internally in a RAM 68 (128×8 bits). Code data are read as they are needed by the program in ROM 66 in order to develop, in known fashion, control and drive signals to operate the various elements of Printer 14 (via lines 70, 70a and Printer Drivers 72). Similarly, Display Drivers 76 connected to Master Microprocessor 24 by lines 74 serve to operate Display 16 (via lines 74a) for visually presenting the last plurality of character inputs in known fashion. Display 16 may be operated in conjunction with or independently of Printer 14 and is also used herein for presenting the misused phrases and alternatives, as will now be described.

In general, according to the present invention, when Typewriter 10 has been set in the Phase-Alert Mode (determined by the SET condition of Flag 809 in Status Register 24D, Control 802 detects through tree 805, entry of any of the misused phrases of Phrase-Alert List 804. Upon detection of each such entry, System 10 alerts the operator of that entry by issuance of any audible signal from Alarm Device 19, provided reference to that Phrase group has not been disabled by the typist (in a manner described subsequently). Then, upon pressing a particular key of Keyboard 12—either a dedicated key such as A-S Key 302 or a combination of keys, as known—Control 802 clears Display 16 and presents the entered phrase, phrase category (see FIG. 3) and its alternatives 822N along with original text. If alternative 822N is not that of the desired word, then the typist may press Index Key 20I and each time this is done, an alternative phrase 822N may be selected by moving cursor. If no . further alternatives 822N are available, pressing Reverse Index Key 20RI causes the previously displayed alternative 822N to be presented/-selected again.

Once the typist recognizes a phrase alternative 822N, as the desired one (or decides to choose a displayed alternative), the typist simply presses the usual Return Key 20R and the misused phrase previously part of the text visible in Display 16 and on Document 15a (ordinarily a paper Sheet 15a, as termed hereinafter) is replaced by the alternative (e.g., 822N, which—together with the remaining text—is again presented in Display 16). Preferably, only changed characters of the misused phrase 822 on Document 15a are erased, intervening good characters not being erased and rewritten, as disclosed in Reference II. Also, replacement is performed properly (see Reference IV), regardless of any disparity in length of the just-mentioned phrase relative to one another even if the printed text contains one or more characters (or, for the matter, one or more words) subsequent to the misused phrase 822. This automatic replacement occurs in response to the typist's pressing of the carrier Return Key 20R. At this point, it may be remarked that the whole Electronic Typewriter or System 10 normally operates in one of two output modes: Typewriter Mode and Memory Mode. In the first of these output modes, the whole Electronic Typewriter or System 10 behaves like a normal typewriter, characters being printed on Sheet 15a as they are entered on Keyboard 12. If Phrase-Alert feature 800 has been activated (Flag 809 thus being Set), three conditions must be met (see FIG. 4) before alerting of entry of a misused phase takes effect. First, entry of a phrase present in List 804 must be detected (detecting of phrase in tree 805). Next, the characters subsequent must include a Word Terminator 112 or 114 to indicate a potentially complete word in dictionary List 806, a condition indicated by a Set state for EWF Flag 34 after the pre-scan described in References I-III. Lastly, the typist's pressing of Spacebar 20S or a punctuation key likewise identifying an end of a word must follow. Then, assuming all phrase categories in List 804 to be enabled, pressing of A-S Key 302 causes clearance of Display 16—as mentioned earlier—and presentation of the entered phrase and its alternatives instead of a "trial word" as in the case of misspelling a word on entry when in Dictionary Mode. Pressing of Index Key 20I thereafter presents, in turn, successive alternatives (if more than one exists) on Display 16.

When a desired alternative is seen on Display 16, then—without moving Cursor 832 back to the alternative phrase—the typist may press Return key 20R to cause Printer 14 to replace the original misused phrase on Sheet 15a automatically with the alternative phrase in Display 16. The alternative phrase will also replace the misused one in Correction Buffer 54.

In Memory Mode, A-S Key 302 and Index Key 20I function in the same manner as in Typewriter mode except for printing since corresponding text does not appear on Sheet 15a during these two modes until Return Key 20R or the equivalent has been pressed after the Control Program in Phrase-Alert (802) has ended. In Memory Mode the code for each Key 18 pressed is entered into a portion of RAM in Microprocessor 24 termed "Memory" (842 in FIG. 1) which consists of 8 or 9 pre-addressed, variable length files selectable at Keyboard 12 and providing 50,000 bytes of storage space. Read out to Printer 14 occurs in response to selection of a PRINT option on Display 16 in known fashion and pressing of Return Key 20R. On the other hand, if Flag 815 is Set when Key 20R is pressed, the original phrase is merely deleted from Memory 842 in known fashion and Alternative phrase 822N automatically inserted in its place in Display 16 of FIG. 1 in fashion well-known in the art (e.g., right-shifting of all subsequent characters with wrap-around, as each character of phrase 822N is entered at that point in the text).

Turning now to a detailed description of the invention, it is assumed, initially, that the typist wishes to be alerted as to entry of any phrase present in the List 804 of misused phrases. Accordingly, the Phrase-Alert feature 800 must first be activated as described hereinafter, setting of P-A Flag 809 to a ONE.

Figure 2:
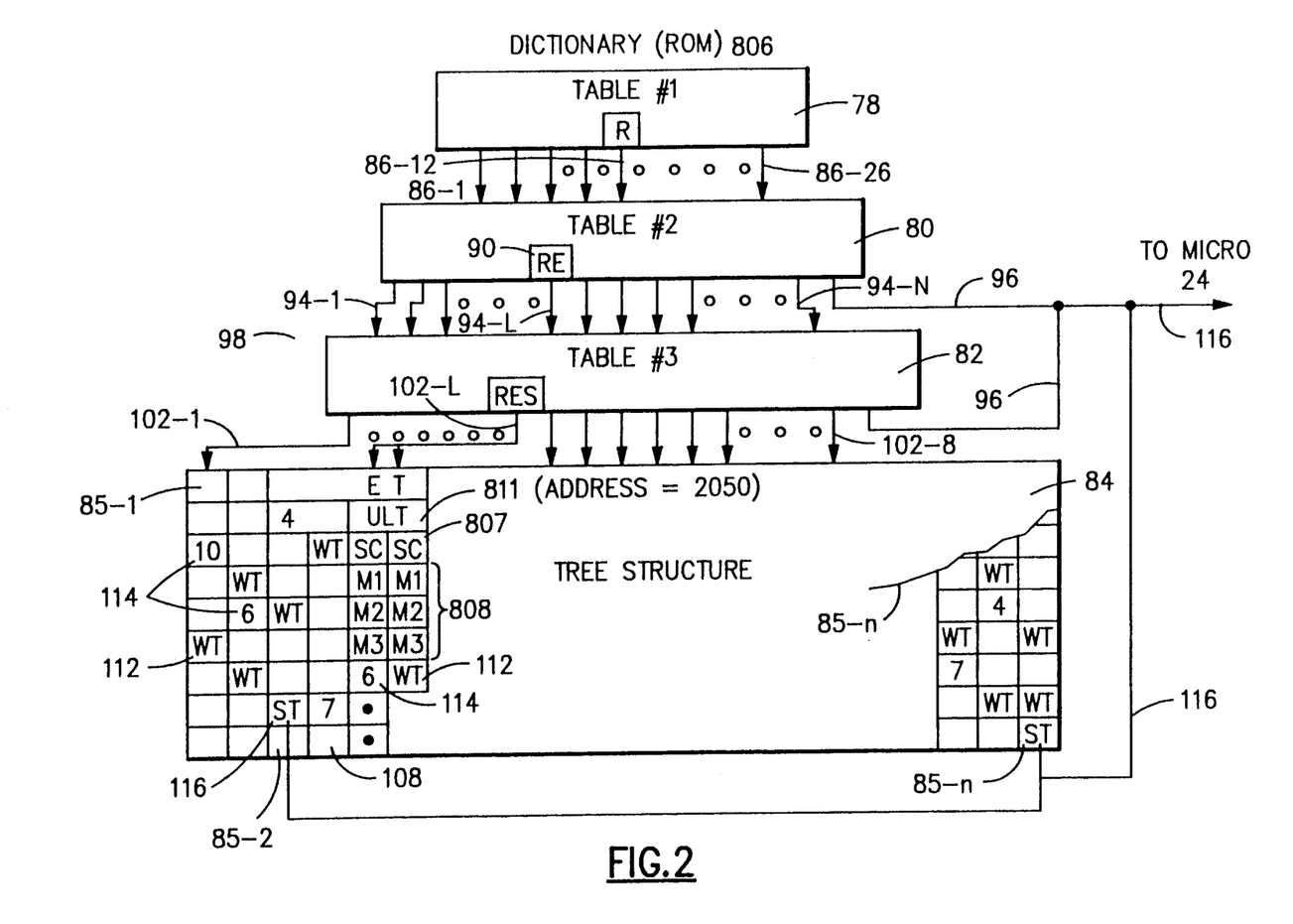
FIG. 2 is a block diagram showing the memory arrangement of the stored dictionary providing the controls of FIG. 1.

Inasmuch as Dictionary Data 806 include codes relevant to the present feature, as stated earlier, it will be assumed for description of this embodiment that the "Spell" feature of References I and III has also been activated, as would be the usual case. Note though, that joint activation is not actually necessary, the checking routines in Dictionary Program 40b being accessible to Phase-Alert Program 802 in fashion substantially identical to the normal one disclosed in Reference I and simplified somewhat in References II–III, except for being dependent upon the set state of P-A Flag 809. As a result, then, Dictionary Flag 33 has likewise been set to a ONE to indicate that activation. Accordingly, as each character of a word is entered, a path is traced into the three tables 78, 80 and 82 of FIG. 2, and—when more than three characters are present, either as part of the word or associated with it in accordance with the invention as next described—extending beyond these tables into Tree Structure 84 where the characters are stored in Huffman coding for compactness (as described in Reference I). Normally, the word entered is spelled correctly, so termination of the word by pressing Spacebar 20S or one of the known punctuation keys on Keyboard 12 sets an EWF Flag 34 which confirms the results of a prescan of the next character—namely, setting of a WT Flag 34 (as described in Reference I) if that next character is a word termination or "WT" Code 112 (or a numeral code 114 denoting a nodal point, as well, as described in References II, III). In the present structure, however, Dictionary List 806 is linked to the Phrase-Alert feature 800 through the known "address" of words within the phrases. As soon as a word is terminated (e.g. by pressing the spacebar) the EWF Flag is checked to see if a word is found in the dictionary data 806. If so, the address of the last character of the word in dictionary data 806 (e.g. 1,236 Hex) is stored in data storage WRADDR 814. As the typist continues to type a string (phrase) of words the same check is done. Once the WRADDR 814 is loaded with an address, that address is compared with an address in Phrase Tree 805 table #1 805A. If a match to WRADDR 814 is located in table #1 805A, then corresponding pointer 805A-N is stored in TRPTR 813 (If no match is found, TRPTR 813 will be initialized to point to the beginning of table #1 805A). TRPTR 813 will now point into table #2 805B that will include the second word of phrases that begin with the word previously typed. This process is continued as each subsequent word is typed, "addressed", and found in the phrase tree. Once a phrase terminator 805 B-CC is found in the phrase tree, the current phrase has been identified as a potentially misused phrase. Hence, because Phrase-Alert Feature 800 is active, detection of the above-mentioned prescan indicates the typist should be alerted as to the confusable nature of this phrase unless typist does not regard the phrase category as being confusable now and objects to an unnecessary distraction. To guard against this latter eventuality, Flag Byte 860 has been added to Status RAM 24D of Master Microprocessor 24.

Enable/Disable Category Byte 860 has one bit for each of the 8 phrase categories of phrases in List 804. These categories are Cliche, Redundant, Informal, Gender Specific, Wordy, Contractions, Wrong and Split Infinitives. The purpose of the Enable/Disable Byte 860 is to afford a given typist the opportunity to disable the generation of warning signals with respect to phrases in List 804 which are not a problem to that typist. By checking the state (i.e. ONE or a ZERO) of the corresponding "Enable/Disable" Bit 860N in Byte 860, Electronic Typewriter or System 10 can ascertain the typist's wishes in that respect, in fashion described shortly. For the moment, it suffices to note that alerting proceeds when current Category bit 861N is a ONE, but is inhibited when Enable/Disable Category bit 860N is a ZERO (the choice being an arbitrary one).

If Electronic Typewriter or System 10 is in Phrase-Alert Mode (P-A Flag 809 is a ONE), the state of the selected Enable/Disable Category 860N of Byte 860 is then determined in known fashion—as by adding the value stored in that Category Bit to a ONE in the adder forming part of an ALU (not shown, but well known) in Microprocessor 24 and looking at the usual Carry Output. If that output is a ZERO, say (the choice being arbitrary, as stated above), a warning signal to the typist is suppressed by exit from the program; the check for additional misused phrases continuing as further text is entered. All this being done at electronic speeds, there is no apparent delay insofar as concerns the typist. On the other hand, if the state of Category Bit 860N is a ONE, then the carry output is also a ONE, indicating that a warning signal is to be issued and consequently Alarm Device 19 is energized with a modulated output (warbling signal, as described in Ref. I).

As may be recalled, an identical warbling signal is emitted by Alarm Device 19 when Dictionary Mode is active and a spelling . error is detected. Signal generation is not actually enabled at this point, however, the situation being rendered somewhat more complex because of the structure of Dictionary List 806.

If the next entry at Keyboard 12 is a Word Terminator (space code, period, or the like) the complete word has been entered and Flag 815 being a ONE, Category Bit in Byte Map 861 are checked. The value stored in Bit Category is then checked in the manner described earlier and, if ONE, causes issuance of the audio warning—namely, the warbling signal. A search of List 804 for the Group 822 containing the alternative phrases then follows, as described shortly.

On the other hand, if the next entry at Keyboard 12 is a character, then the word was not completed and scanning of Dictionary List 806 to find the matching character is to continue. Hence, Flag 815 is immediately reset together with the WT Flag 34 previously set to identify and "end of word" tentatively, as described in References I-III. Note that in the latter references, numeral codes 114 serve both as a nodal point —i.e., a point where one or more characters may be added to a matching string of characters to form additional words sharing that string—and also as a possible "End-of-Word" indicator. Detection of a numeral code 114 in Dictionary 806 thus sets not only a numeral code flag (not shown herein), but also the above-mentioned WT Flag 34.

Once an error is detected, the typist can respond with the related sequence of key depressions (302,20I) to produce a trial correctly-spelled word (as in Ref. III) in case an incorrectly-spelled word is entered in Keyboard 12. Conversely, if the problem is an entry of a misused phrase, depression of the identical keys (302, 20I) causes presentation of the alternative phrases. By successively depressing index Key 20I, these alternatives sequence so that the typist scans them one at a time to determine which alternative most nearly matches the intended one, as stated above. Each alternative is viewable in Display 16 until the Index Key 20I is pressed again to bring forth the next alternative from Phrase-Alert List 804, as explained below.

Alternative phrases 822N are stored separated by semi-colons 875 and the last alternative is terminated with phrase stop 876.

Figure 4:
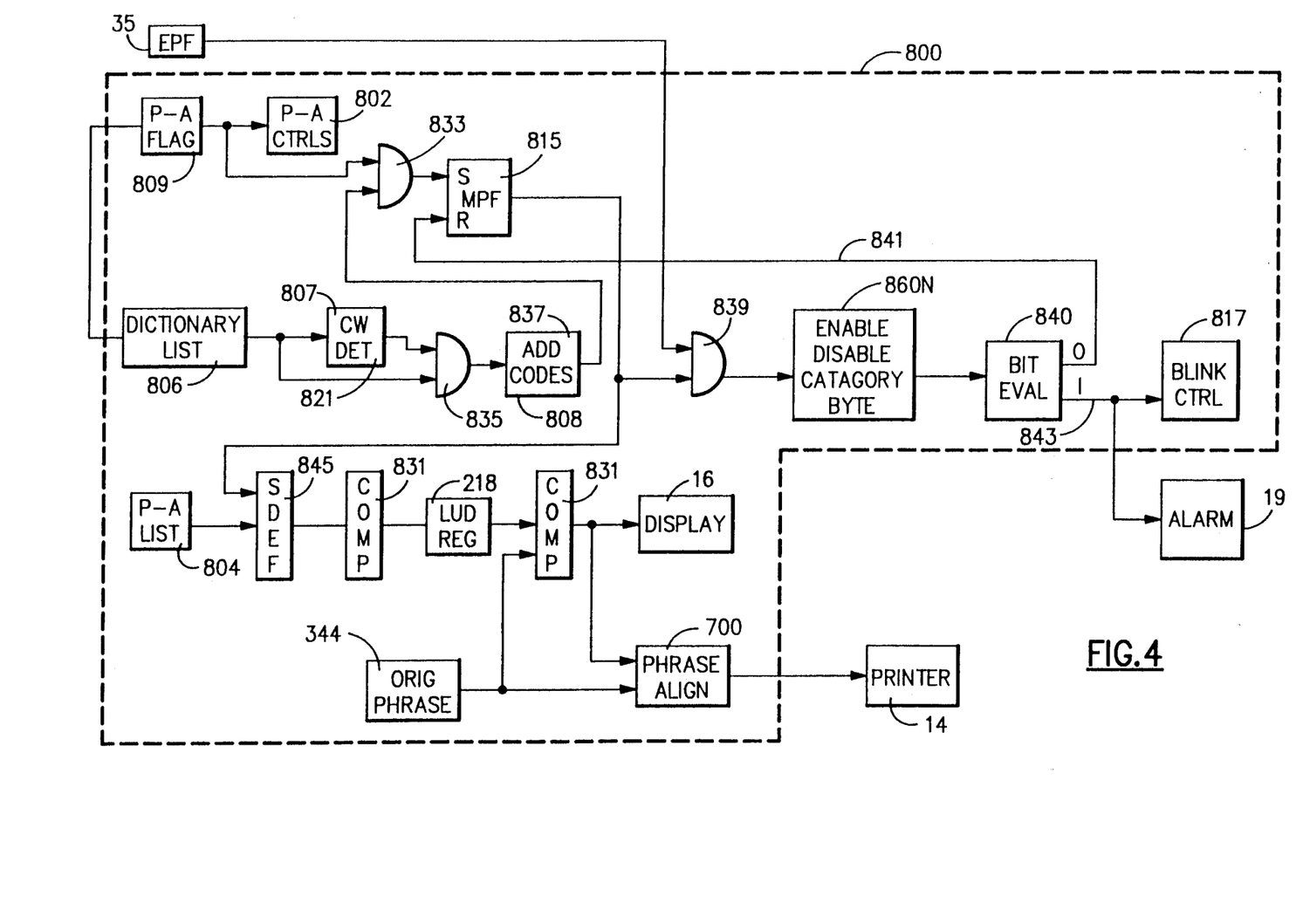
FIG. 4 is a combined block and schematic diagram showing the interaction between the Dictionary List modified to designate entered phrases which are potentially misused, an operator controlled Bit Map indicating whether a given phrase group is actually desired to be checked , the control conditions (Flags) for alerting the operator, and the registers respectively storing the original phrase and the alternative phrase accepted by the operator by pressing a print control key of the system keyboard in FIG. 1.
Figure 5:
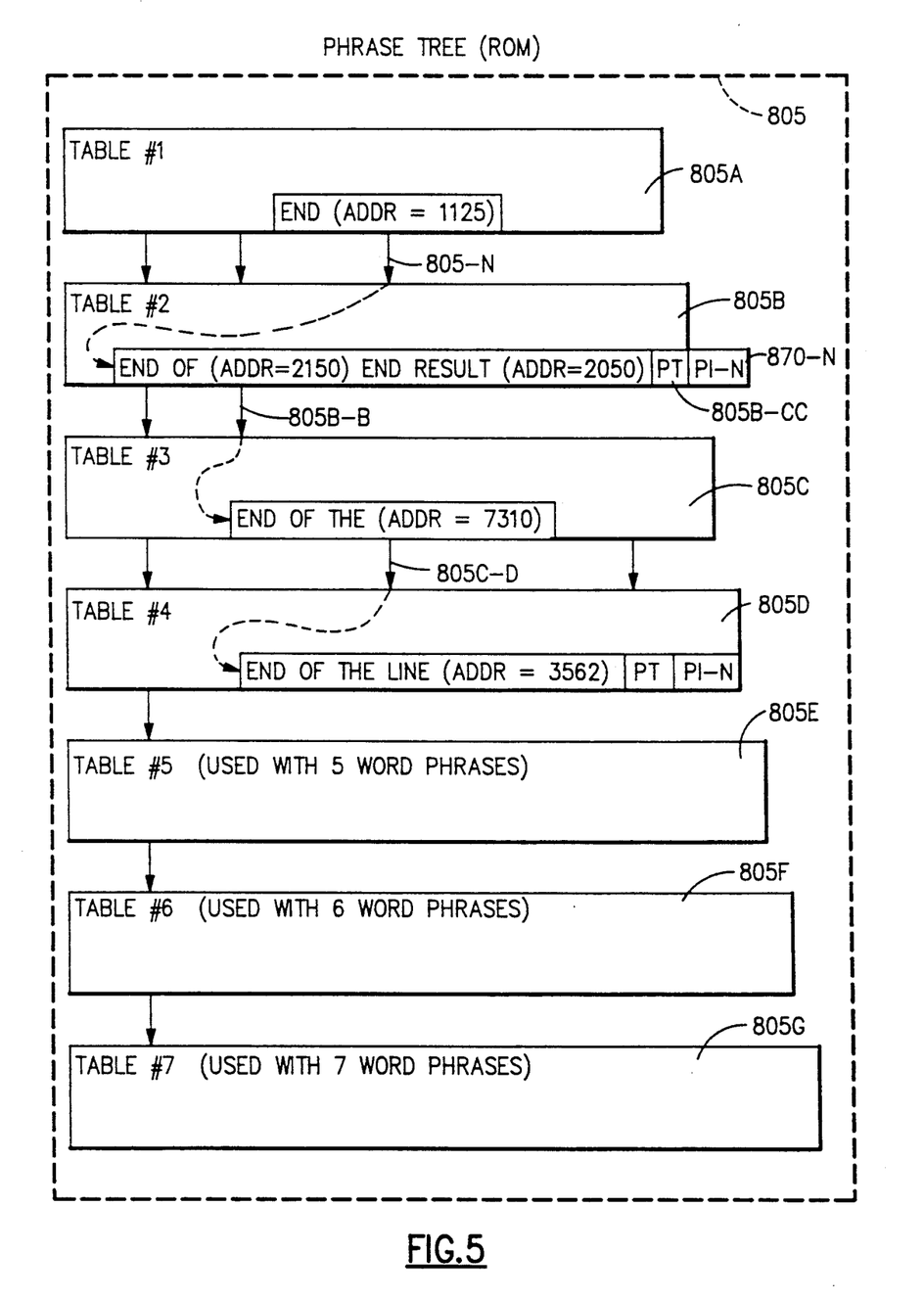
FIG. 5 is a block diagram showing memory arrangement of the stored phrase tree structure.
Figure 6A:
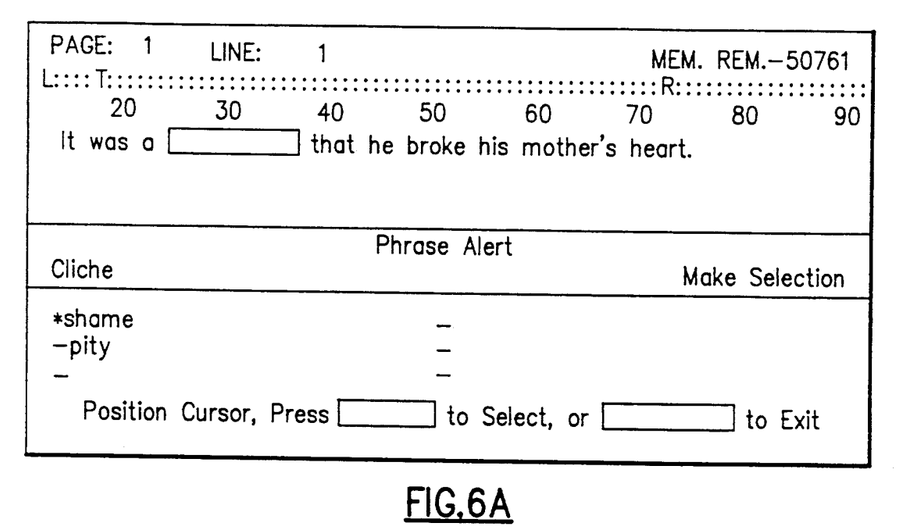
FIGS. 6A, 6B and 6C show examples of particular presentations and menus which might seen in Display 16 during the operation of the Phrase-Alert teachings of the present invention.

Before discussion of operation, a brief review of the invention on the basis of structure and controls depicted in FIG. 4 is believed desirable. There it is seen that Phrase-Alert requires first that the P-A Flag 809 be Set as indication that Phrase-Alert Feature 800 has been activated. In conjunction (symbolic AND gate 833), a Detector 821 associated with Dictionary List 806 must indicate that the word entered completes a misused phrase in tree 805 setting the "misused phrase" Flag (MPF) 815. At the same time, the positive indication from Detector 821 provides (symbolic AND gate 835) for storing Address Codes 808 (preferably after conversion to Hex code and manipulation into whole byte and fractional byte counts) in a temporary register as shown by block 837. Then, if the next entry at Keyboard 12 is an "End-of-Word" symbol, such that EWF Flag is Set in addition to MPF Flag 815, then the address information of Block 837 is retrieved so as to identify the location of the Enable/Disable Bit 860N and (symbolic AND gate 839) applied to correct category 861N to obtain the content of Enable/Disable Category Bit 860N. If a ZERO (disable) is present, an output on a line 841 from a bit Evaluator (Block 840) immediately resets MPF 815. On the other hand, if a ONE is present, an output on a line 843 activates Alarm 19 and Blink control 817 (LED's not shown in FIG. 4). Thereafter, the typist's pressing of A-S Key 302 with MPF 815 still Set causes a reference to Phrase-List 804 to locate the matching phrase in Phrase-Alert list 804. The screen shown in FIG. 6A is then put on display 16. Then, depending upon the typist's decision as to the most appropriate phrase alternative Index key 20I or reverse Index Key 20RI may be pressed to select the appropriate phrase by moving the cursor to the said phrase.

Return Key 20R is pressed to select the Alternative Phrase currently stored in phrase list 804 in location 822N (The misused phrase "crying shame" is to be replaced by alternative phrase "pity".

If System 10 is in typewriter output mode and the Alternative phrase is selected, correction of Document 15A on printer 14 may require substantial automatic erasure and Word Alignment as indicated by Block 700.

Turning next to operation, Phrase-Alert 800 may be activated while System 10 is in the typewriter, or memory output modes previously described. As a result of enabling the Phrase-Alert feature P-A Flag 809 is Set, causing LED 810 (located adjacent Display 16 in FIG. 1) to be turned ON in known manner and also causing Device 19 to emit a non-modulated, audible output (or "beep" as termed herein) to signal that Feature 800 is now active. This output is the one described in Reference I as the usual response of System 10 indicating acceptance of control command (depression of an alphabetic key 18—or other key, as may be desirable—simultaneously with Code key 21, as stated earlier).

Once Phrase-Alert Feature 800 has been activated then, since P-A Flag 809 is Set, whenever any of the 2900 commonly misused phrases of List 804 is entered, Phrase-Alert Control Software 802 takes over. If Flag 809 were not Set, the following Address Codes 808 would be skipped over in known fashion and pre-scan would then detect either a numeral code 114 denoting the end of a share word or WT code 112 denoting the end of all words based on the same shared portions, as described in References I–III. Because P-A Flag 809 has been Set in this cases, the address codes 808 are not to be skipped, but used to identify the bit locating the corresponding "Enable/Disable Alert" Bit 860N. The state of that Bit 860N is then determined in the manner previously described and, if a ONE, the Misused Phrase Flag 815 remains Set. Upon being interrogated by Master Microprocessor 24, that Set state of Flag 815 causes issuance of alarm commands to Slave Microprocessor 60 on Bus Line 58. In turn, via the Output Lines 75a, the Alarm 19 and Blink Controls 817 are energized, the form for a known predetermined period and the latter for so long as MP Flag 815 is set (Flag 815 being reset in known fashion upon detection of a character entry or pressing of A-S Key 302 at Keyboard 12). Note that the call for the typist's attention involves both emitting a modulated ("warbling") signal from Device 19 and also causing Phrase-Alert LED 810 to blink intermittently as evidence that the problem is an entry of a misused phrase 822 rather than a spelling error. If the problem had been the latter, LED 812 associated with Dictionary Mode (assumed also to be ON for purposes of this description, as stated earlier) would blink intermittently instead. Note that in each case the intermittent blinking stops as soon as entry of the next word begins. An overrun by the typist is thus not only possible, but is even likely with speed typists.

No matter what output mode System 10 is in: whether Typewriter Mode or Memory Mode; the warbling signal is emitted from Device 19 once misused phrase 822 has been completed. If the typist has gone past the phrase by typing several characters or even words from the following text—which is likely with speed typists, as mentioned above—the "Find" control disclosed in Reference V or manual backspacing one word at a time, followed by forward spacing over the word; may be used to identify and locate the misused phrase 822 (e.g., "learned" in FIGS. 2 and 3). Note that in Memory Mode, forward spacing advances Cursor 832 and does not write a space code over existing characters, but sequentially re-enters these last in the checking routine of Dictionary Program 40b, as seen next. Thus, to locate misused phrase 822, successive Characters of each word (demarcated at beginning and end by space codes or other punctuation codes) are used to establish a path in Dictionary Data 806 (as though entered Through Keyboard 12 in the fashion described in References I and III) to determine presence of a misspelled word or a misused phrase, the latter being indicated by detection of phrase in phrase tree 805, according to the invention, if in Phrase-Alert Mode (Flag 809 Set). When a phrase located in phrase tree 805 is attained, that circumstance is signalled by again setting Flag 815 (previously reset by the Character over-run) to a ONE, such that Phrase-Alert LED 810 blinks to indicate that the particular phrase just found has been flagged due to Phrase-Alert Feature 800 rather than the Dictionary feature (i.e., LED 812 is not blinking) described in Ref. I and improved in Ref. III.

Figure 6B:
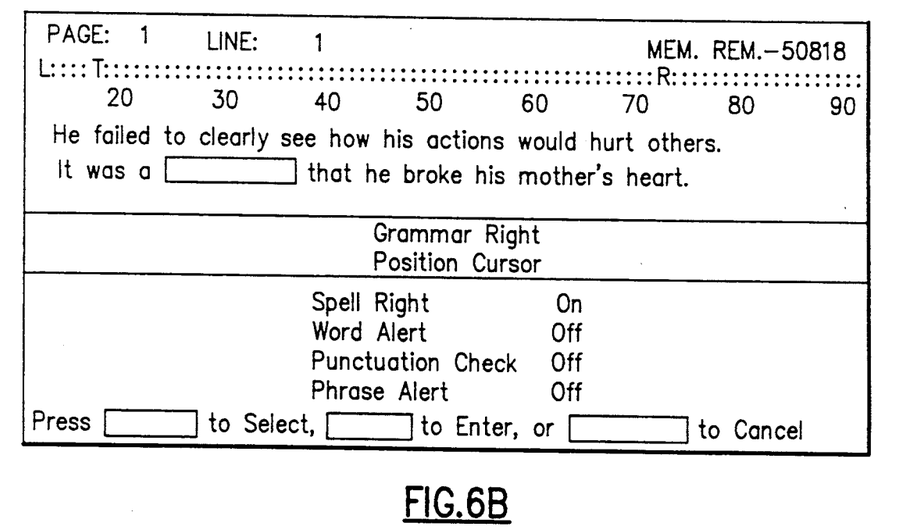
Figure 6C:
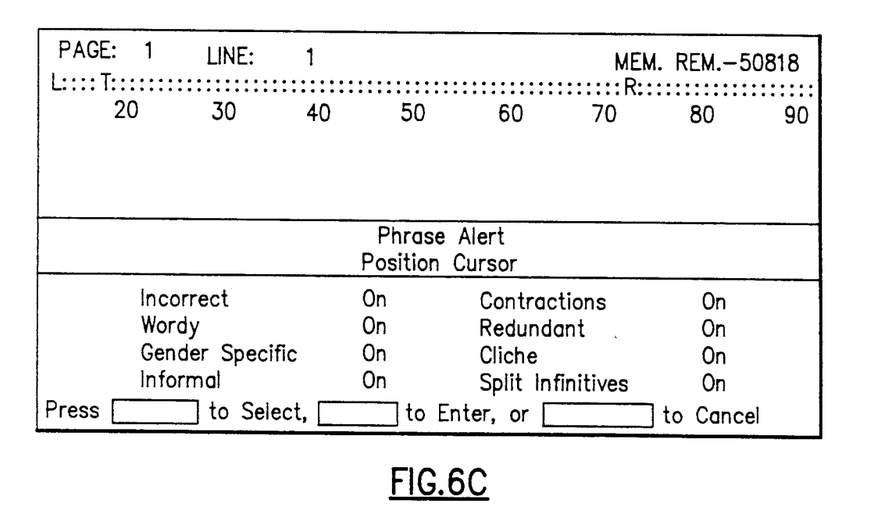

Having found the phrase flagged (LED 810 blinking), the typist first depressed A-S Key 302 to view the previously described screen in FIG. 6. As a result of pressing A-S Key 302, the flagged original phrase is stored in a Register 344 and a scan of list 804 is begun to locate the alternative phrase 822N that are replacement for the current misused phrase.

Figure 3:
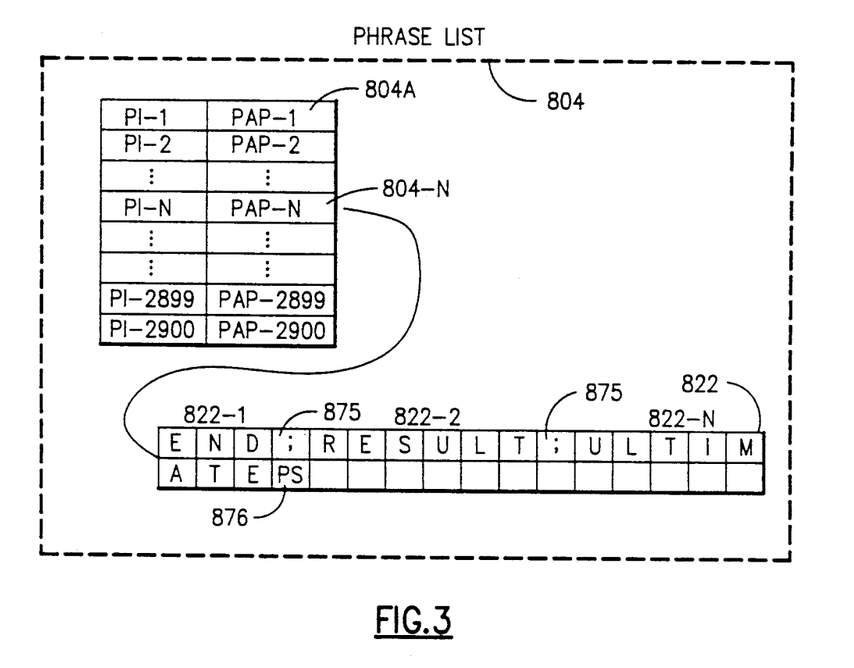
FIG. 3 is a block diagram showing examples of misused phrase groups typical of those comprised in the Phrase-Alert list of FIG. 1.

To locate the alternative phrase 822N for current phrase 822, the phrase Index 870N from phrase tree 805 is used as an index into phrase list 804 (FIG. 3). The phrase index 870N is used as an offset into table 804A in a known manner to locate the corresponding phrase alternative pointer 804A-N. This phrase alternative pointer (PAP) is the actual address of the phrase alternative 822N. This address is used to locate the first alternative phrase. All alternative phrases 822N are separated from each other by semi-colons 875. If a semi-colon is encountered while scanning 822 then the next alternative phrase can be displayed, starting with the next character. The entire list of alternative phrases 82 is terminated with phrase stop code 876. When this code is encountered, it is known that all possible alternative phrases are now displayed.

After reading alternates 822N, if the typist finds the latter to be more appropriate—i.e., the Original phrase 822 was misused—the more appropriate Alternative phrase 822N may be selected by pressing Return Key 20R when Cursor 832 is located at the left of the alternative word 822N. The misused phrase 822 is then preferably replaced automatically on Document 15A with realignment of the kind disclosed in Reference IV, if such is necessary.

If, on the other hand, the typist does not think the original phrase 822 was misused after reviewing its alternatives 822N, the original phrase 822 is retained in the text simply by a further depression of A-S Key 302. Display 16 is then cleared of any alternative phrase 822N and the screen shown in FIG. 6, the original text being redisplayed thereafter in known fashion. The typist may then again resume typing (preceded by pressing a known "Relocate" Key—not shown—to move to the end of the entered text, if desired. Of course, if the typist decides that there is no need to review the alternatives 822N of a potentially misused phrase 822, the alerting signals may be ignored and the foregoing actions dispensed with entirely, Phrase-Alert Program Feature 800 containing to check each newly-entered phrase against phrase tree 805 as controlled by Enable/-Disable Category Bit 860.

In Memory Mode, the above-described steps are similarly required except that if Return Key 20R is pressed to select an Alternative phrase 822N as replacement for the misused phrase 822, replacement is simply performed automatically in File memory 844 and Correction Buffer 54, the misused phrase 822 being deleted and the selected Alternative phrase 822N inserted in its place, and the amended line then presented in Display 16—all in known fashion (see, for example, the description in Reference II).

In Memory Mode, Phrase-Alert 800 may also be activated when the position of Cursor 832 is either at the beginning or at the end of text which has been entered and stored, previous entry of misused-phrase 822 having produced a warbling signal from Device 19 and a blinking of LED 810 to mark particular phrases as potentially misused ones, but the typist having ignored these signals at the time. Simultaneous pressing of Code Key 21 plus the Character Key 18F causes initiation of the above-mentioned "Find" operation. The resultant forward (or backward) scan of text in File Memory 842 will then stop successively at each phrase (defined by word terminator codes—periods, commas, etc—before and after a string of character) entered previously through Key-board 12. Each such phrase is sensed once again by entry of successive characters through the paths defined by Dictionary Tables 78, 80, 82 and 84, in the same manner as described previously. Encountering a mis-spelled word or potentially misused phrase is signalled by flashing of the respective LED 812 or 810.

The typist can then depress Spacebar to turn Off to On or On to Off. When Phrase-Alert is turned on, the presentation and menu appears (see FIG. 6C). When phrase alert is turned on, P-A flag 809 is set to one to signify to microprocessor 24 that phrase alert is enabled.

The typist can depress Return/Relocate Key if the typist does not want to deactivate any categories or Position cursor to each category if the typist wishes to activate or deactivate then by using index key 20I or reverse index key 20RI depress Spacebar to change On to Off. When a category is turned on, the corresponding bit in Enable/Disable category byte 860 is set to a "one" to signify that current category is enabled. Setting a specific bit in byte 860 to a Zero will disable that category from being checked. The typist must depress Return/Relocate Key to return to previous screen.

To activate or deactivate phrase-Alert categories, the typist must depress Code Grammar-Right (Back Space) Key. Several lines of text remain on the display. Display window prompts (For example see FIG. 6B). The typist must then depress Index Key to move cursor to Phrase-Alert option.

Although certain preferred embodiments have been shown and described, it should be understood that many changes and modifications may be made therein without departing from the scope of the appended claims.

I claim:

1. A word-processing system having a memory, character and control input to the system through a keyboard with a plurality of alphanumeric and function keys depressible by an operator, and a display, in combination wherein said memory includes:
   a. a spelling dictionary part;
   b. a phrase alert part which is responsive to said spelling dictionary part;
   c. a list of correctly spelled words in said spelling dictionary part such that each of said correctly spelled words is assigned a specific location in said list of correctly spelled words and those correctly spelled words that are also included in said phrase alert part include a special code;
   d. decoding tree means in said phrase alert part for providing a list of plural sets of series of specific locations of words in said list of correctly spelled words in said spelling dictionary part that include a special code, such that each of said sets correspond to a series of words in a potentially misused phrase;
   e. table look up means in said phrase alert part for providing a list of alternative phrases corresponding to each of said potentially misused phrases which corresponds to said sets of series of specific locations of words in said list of correctly spelled words in said spelling dictionary part that include a special code, said list of alternative phrases being identified by said decoding tree means in said phrase alert part;

f. means for registering said locations of words in said list of correctly spelled words;

g. means for comparison of the characters being entered into the system with said list of correctly spelled words in said dictionary part, such that said dictionary part recognizes when a word has been entered and compares the entered word with said list of correctly spelled words and upon entry of a word that is included in said list of correctly spelled words and contains said special code, said assigned specific location of said word is provided as input into said means for registering said specific locations of words;

h. detection means for comparison of said specific locations in said means for registering with said list of plural sets of series of specific locations of words that correspond to a series of words in a potentially misused phrase;

i. a selectively enabled generator of a warning signal for the operator that is activated in response to sensing entry of any of said potentially misused phrases by said detection means; and j. a first control responsive to pressing a discrete one of said depressible keys, said first control being operable to present in the display any potentially misused phrase so detected along with said list of alternative phrases corresponding to said potentially misused phrase.

2. The Word processing system of claim 1 including a second control being interposed between said detection means and said warning signal generator, said second control being actuatable by said operator for selectively disabling the responsiveness of said generator to entry of at least one category of said potentially misused phrase on said list of said decoding tree means and said table look up means.

3. The word processing system of claim 2, wherein said disabling is responsive to the operator's pressing of an other one of said depressible keys subsequent to pressing said discrete one of the depressible keys.

4. The work processing system of claim 3, wherein said disabling relates to said category of alternative phrases and is responsive to the operator's pressing of said other one of said depressible keys subsequent to pressing a second discrete one of the depressible keys to display said alternative phrases.

5. The word processing system of claim 1, further including program controls for inserting and removing data from text entered in said display, means responsive to pressing a second discrete one of said depressible keys and effective for causing display of said at least one alternative phrase to the alerting phrase, and a third control responsive to the operator's pressing of a further one of said depressible keys when the displayed alternate phrase more nearly matches the desired phrase, said third control being operable to replace said any word in said text by the alternative word.

6. The word-processing system of claim 5, further including a printer and a document held in the printer, together with a correction ribbon for removing undesired text from said document, said document having any phrase and one or more subsequent characters printed thereon, and wherein said third control comprises means, including said correction ribbon, operable to amend said any phrase on said document into conformity with said alternative phrase in response to pressing said further one of said depressible keys.

7. The work-processing system of claim 7, wherein there is a length disparity between said any phrase and said alternative phrase, and further including:

a) means sensing existence of said length disparity, and b) means responsive to sensed existence of said length disparity and automatically operable to amend said document to present said alternative phrase and said one or more subsequent characters in proper alignment on said document.

8. The word-processing system of claim 5, wherein said display includes a cursor movable relative to character therein and has a capacity less in number than the totality of characters in said alternative phrase and the definition thereof, such that a terminal portion of said totality of characters is displayable only by exclusion of said alternative word from said display upon scrolling of said terminal portion relative to said cursor to bring about display of said terminal portion, and means operating said third control independently of display of said alternative phrase.

9. The word-processing system of claim 8, wherein said means operating said third control comprises a register storing an address relating to said alternative phrase.

* * * * *